United States Patent
Meacham et al.

(10) Patent No.: US 8,984,033 B2
(45) Date of Patent: Mar. 17, 2015

(54) NON-INDEXED IN-MEMORY DATA STORAGE AND RETRIEVAL

(75) Inventors: Paul Meacham, Tinley Park, IL (US); Jacob Doornebos, Riverside, IL (US); James P. Moran, Hinsdale, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 1654 days.

(21) Appl. No.: 11/234,697

(22) Filed: Sep. 23, 2005

(65) Prior Publication Data
US 2007/0073634 A1    Mar. 29, 2007

(51) Int. Cl.
G06F 17/30    (2006.01)
G06Q 40/04    (2012.01)

(52) U.S. Cl.
CPC .......... *G06F 17/30492* (2013.01); *G06Q 40/04* (2013.01)
USPC ........... 707/899; 707/706; 707/722; 707/736; 707/758; 706/12; 706/14

(58) Field of Classification Search
None
See application file for complete search history.

(56) References Cited

U.S. PATENT DOCUMENTS

| | | | |
|---|---|---|---|
| 5,590,362 A | | 12/1996 | Baum et al. |
| 5,719,564 A | | 2/1998 | Sears |
| 5,729,742 A | | 3/1998 | Harbinski et al. |
| 5,845,276 A | | 12/1998 | Emerson et al. |
| 6,389,510 B1 | * | 5/2002 | Chen et al. ................... 711/113 |
| 6,865,650 B1 | | 3/2005 | Morley et al. |
| 6,879,987 B2 | * | 4/2005 | Hsieh ........................ 707/104.1 |
| 6,907,422 B1 | * | 6/2005 | Predovic .......................... 707/2 |
| 6,993,511 B2 | | 1/2006 | Himmelstein |
| 7,225,207 B1 | * | 5/2007 | Ohazama et al. .................... 1/1 |
| 7,299,241 B2 | * | 11/2007 | Reed et al. ........................... 1/1 |
| 7,334,003 B2 | * | 2/2008 | Frame et al. ........................ 1/1 |
| 7,389,262 B1 | * | 6/2008 | Lange ............................. 705/37 |
| 2002/0004774 A1 | * | 1/2002 | Defarlo ......................... 705/36 |
| 2002/0023077 A1 | | 2/2002 | Nguyen et al. |
| 2002/0055886 A1 | * | 5/2002 | Hinckley ....................... 705/26 |
| 2003/0028506 A1 | | 2/2003 | Yu et al. |
| 2003/0040955 A1 | | 2/2003 | Anaya et al. |
| 2003/0055776 A1 | | 3/2003 | Samuelson |
| 2003/0065709 A1 | | 4/2003 | Jordan et al. |
| 2003/0084028 A1 | * | 5/2003 | Hsieh ............................... 707/3 |
| 2003/0115120 A1 | * | 6/2003 | Kramer et al. ................. 705/35 |
| 2003/0236738 A1 | * | 12/2003 | Lange et al. ................... 705/37 |
| 2004/0098663 A1 | * | 5/2004 | Rey et al. ...................... 715/500 |

(Continued)

FOREIGN PATENT DOCUMENTS

| | | |
|---|---|---|
| WO | 2008073009 A1 | 6/2008 |
| WO | 2006042066 A1 | 12/2010 |

OTHER PUBLICATIONS

Licht, B. ("Database Time Test Scores", Borland Delphi for windows, City Zoo, 1995).*

(Continued)

*Primary Examiner* — Hung Le
(74) *Attorney, Agent, or Firm* — Banner & Witcoff, Ltd.

(57) ABSTRACT

Systems, methods and user interfaces that allow rapid storage and retrieval of trading data are provided. Trading data records are arranged as a non-indexed collection of data records. The physical location of trading data records stored in a computer-readable medium corresponds to the order that queries are performed. Queries may be performed by analyzing attributes of all of the trading data records, without speed limitations associated with indexed databases.

10 Claims, 6 Drawing Sheets

(56) References Cited

U.S. PATENT DOCUMENTS

| | | |
|---|---|---|
| 2004/0107123 A1* | 6/2004 | Haffner et al. .................... 705/7 |
| 2004/0193527 A1* | 9/2004 | Kelly et al. ..................... 705/37 |
| 2005/0086295 A1 | 4/2005 | Cunningham et al. |
| 2005/0091148 A1* | 4/2005 | Rotondo ......................... 705/37 |
| 2005/0114405 A1* | 5/2005 | Lo ............................... 707/200 |
| 2006/0013367 A1 | 1/2006 | Sawyer et al. |
| 2006/0242371 A1 | 10/2006 | Shono et al. |
| 2007/0073634 A1 | 3/2007 | Meacham et al. |
| 2007/0192230 A1 | 8/2007 | Meacham et al. |
| 2008/0005294 A1 | 1/2008 | Morris |
| 2009/0299914 A1 | 12/2009 | Moran et al. |
| 2012/0022995 A1* | 1/2012 | Lange ............................ 705/37 |

OTHER PUBLICATIONS

Wayback machine, "http://web.archive.org/web/*/http://www.mindspring.com/~cityzoo/dbperf.html".

Wayback machine, "http://web.archive.org/web/19981206071324/http://www.mindspring.com/~cityzoo/dbperf.html".

International Preliminary Report on Patentability from International Application No. PCT/US2007/067224, date mailed Oct. 15, 2009, 6 pages.

Extended European Search Report in related EP 06804003.9, Sep. 17, 2013.

H-T Chou et al., "Design and Implementation of the Wisconsin Storage System," Software-Practice and Experience, vol. 15 (1), No. 10, Oct. 31, 1985.

Biliris A., "The Performnce of Three Database Storage Structures for Managing Large Objects," Sigmod Record, ACM, NY, NY, vol. 21, No. 2, Jun. 1, 1992.

Rosenblum, M. et al., "The Design and Implementation of a Log-Structured File System," ACM Transactions on Computer Systems (TOCS), Association for Computing Machinery, Inc., vol. 10, No. 1, Jan. 1, 1992.

Eugster, et al., "The Many Faces of Publish/Subscribe", in ACM Computing Surveys, vol. 35, No. 2, pp. 114-131, Published Jun. 2003 (online) Retrieved from the internet <URL: http://www.ece.rutgers.edu/~parashar/Classes/03-04/ece572/papers/facesps.pdf.

International Search Report from International Application No. PCT/US10/44351 mailed Oct. 15, 2010, 3 pages.

* cited by examiner

NON-INDEXED IN-MEMORY DATA STORAGE AND RETRIEVAL

FIELD OF THE INVENTION

The present invention relates to systems, methods and user interfaces that are utilized in connection with the trading of financial instruments. More particularly, the invention provides mechanisms for collecting, storing, querying and retrieving trading data in a memory.

DESCRIPTION OF THE RELATED ART

Modern exchanges must process and monitor a large volume of trading data, such as orders for financial instruments. Large exchanges are required to process and store large amounts of trading data every second of the trading day. Moreover, upon executing trades, exchange computers must continually access and distribute market data, which is another form of trading data. The distribution of market data facilitates necessary market-driven decisions. Indeed, risk analysis of current and future exposure is vital to ensuring a stable financial exchange. Often large databases are utilized to store and retrieve this trading data.

To select and aggregate trading data, conventional databases often use sorts, searches, indexes, and/or disc lookups. These requirements result in substantial chip clock cycles and lead to delayed query results. Current analysis systems utilized to aggregate large quantities of trading data are often executed in batch mode overnight because of the computing resources that are consumed by these activities. Often the aggregation and retrieval of trading data is not efficient enough to allow adequate information to be retrieved within the desired timeframe. Indeed, under traditional approaches, large amounts of trading data cannot be adequately analyzed in real-time, thereby preventing many uses of the data.

Prior art attempts have focused on building more intelligent indexes to speed up selection and analysis of the data stored within a database. Yet other systems have attempted to reduce response time to users through the use of precomputed summary data. These and other attempts to more efficiently store and retrieve trading data do not adequately address the problem. For example, precomputed indexes cannot be rapidly adapted for changing user needs or changing data. Additionally, precomputed data requires the user to specify the data that needs to be precomputed. When there is a need to analyze data from different angles or perspectives, these conventional systems fail to deliver results in a rapid fashion. Therefore, there exists a need in the art for systems and methods that allow for the efficient storage and searching of large amounts of data in a time sensitive manner.

SUMMARY OF THE INVENTION

The present invention overcomes at least some of the problems and limitations of the prior art by providing systems and methods that allow for the efficient storage and searching of large amounts of data. Trading data may be arranged as a non-indexed collection of data records within one or more computer-readable media. Exemplary computer-readable media include magnetic memories, hard disk drives, and optical disk drives. Solid-state memory modules allow for rapid queries due to the lack of moving parts, such as those associated with hard disk drives. Trading data may be arranged in a computer-readable medium in a manner that facilitates rapid querying and does not require the use of an index. For example, the physical location of trading data stored in a computer-readable medium may correspond to the order in which queries are performed. If queries are created to analyze ten trading data records in sequential order, the trading data records are physically stored in sequential order. Queries may be performed by analyzing attributes of all of the trading data records, without the speed limitations and overhead associated with indexed databases.

Of course, the methods and systems disclosed herein may also include other additional elements, steps, computer-executable instructions, or computer-readable data structures. The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Exemplary Operating Environment

Figure 1:
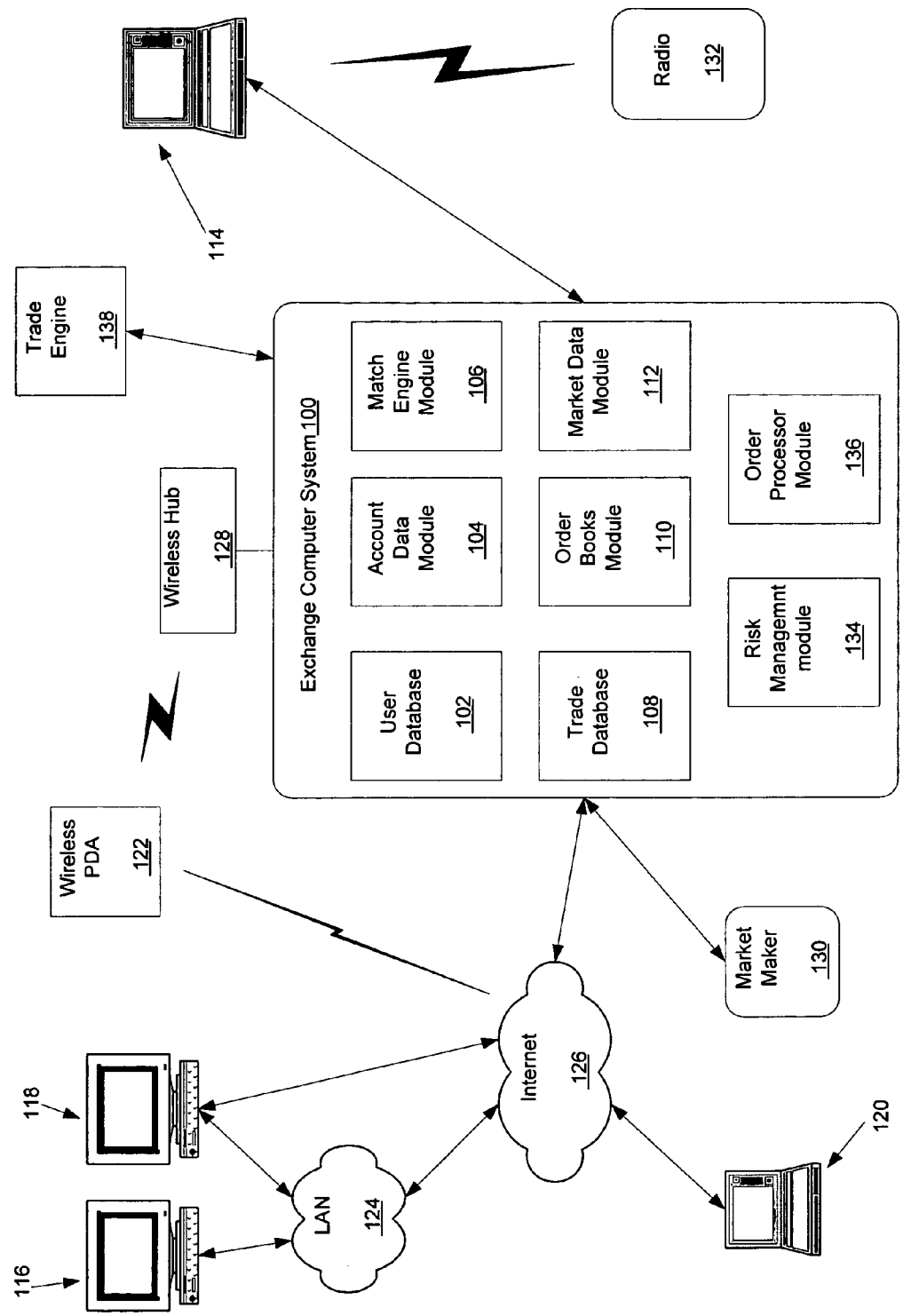
FIG. 1 shows a computer network system that may be used to implement aspects of the present invention.

Aspects of the present invention are preferably implemented with computer devices and computer networks that allow users to exchange trading information. An exemplary trading network environment for implementing trading systems and methods is shown in FIG. 1.

An exchange computer system 100 receives orders and transmits market data related to orders and trades to users. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

Figure 2:
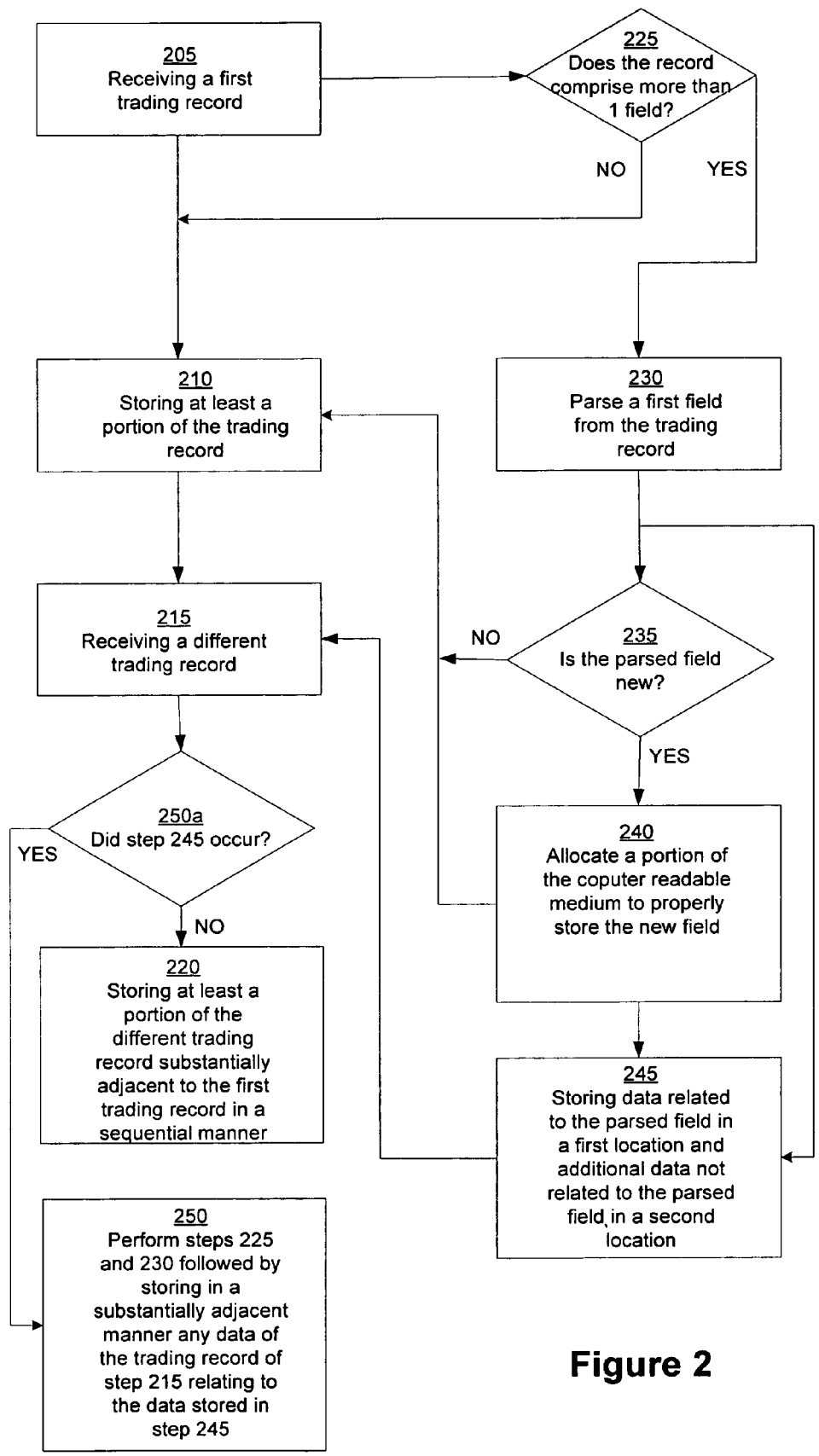
FIG. 2 shows a flowchart of one illustrative method of storing trading data in a computing environment according to one aspect of the invention.

FIG. 2 shows a flowchart of one illustrative method of storing trading data in a computing environment according to one aspect of the invention. As seen in the figure, a first trading record comprising trading data is received in step 205. The trading record may be an order received at an exchange, a market data distributed by an exchange or a trade. In alternative embodiments of the invention, the trading record may be a record created by an exchange that indicates the state of an order book, orders received and processed, or any other information that may be use by an exchange or entity involved with trading. The trading data may include one or more specific identifiers of an order or trade, including: the time and date of the order or trade, the individual or firm that submitted an order, price information and/or the identification and quantity of financial instruments. The trading record may comprise an order first transmitted from computer device 116 and/or PDA 122 through LAN 124 and/or Internet 126 and may be further processed by order processing module 136. In yet other embodiments, the trading record received in step 205 may comprise market data distributed by one or more of the modules within Exchange Computer System 100. As one skilled in the art will realize, there are numerous other fields that may be included within a trading record.

Figure 3B:
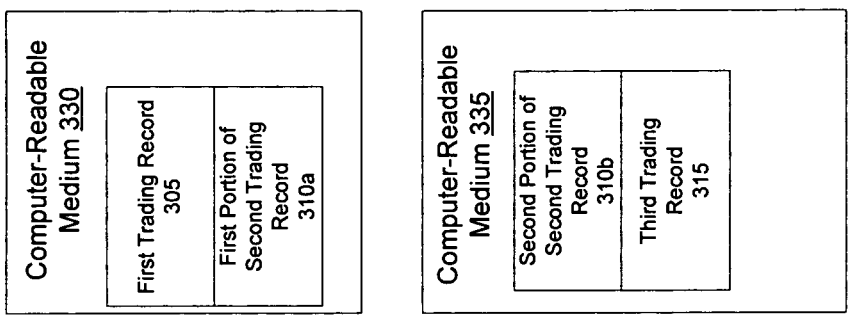
FIGS. 3a and 3b illustrates illustrative collections of trading data according to various embodiments of the present invention.
Figure 3A:
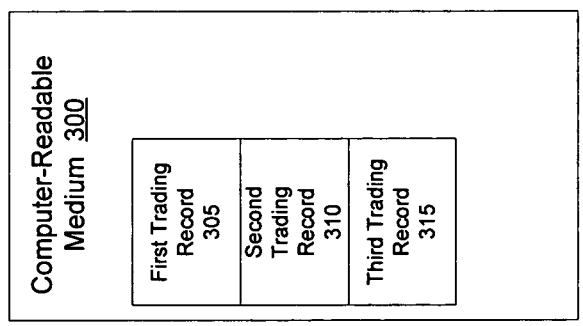

In step 210, at least a portion of the data from the trading record received in step 205 is stored on a computer readable medium. As used herein, a computer-readable medium may include, for example, RAM, flash memory, a hard disk drive, and/or an optical disk (CD ROM, DVD or other optical media). Solid-state memory modules allow for rapid queries due to the lack of moving parts, such as those associated with hard disk drives. In one embodiment, the medium is within the Exchange Computer System 100 and may be associated with one or more modules, such as the match engine module 136. FIG. 3*a* illustrates a collection of trading data according to one aspect of the present invention. As seen in the figure, a memory module 300, such as a RAM or optical disk, may store a plurality of trading records. For example, the trading record stored in step 205 may be visually represented as trading record 305. In step 215, a second trading record may be received. The second trading record may be of a fixed length and have substantially the same information as the first trading record received in step 205. Yet in other embodiments, the second trading record may of a different length than the first trading record. Yet in further embodiments, the second trading record may have additional fields not present in the first record and may comprise additional data not present in the first record. In one such embodiment, optional step 225 (explained in more detail below) may be implemented to determine if the trading record comprises more than one field.

In step 220, the second trading record (or a portion thereof) is sequentially stored in relation to the first trading record 305, wherein the data from the second trading record is stored substantially physically adjacent to the data received from the first trading record 305. One of the advantages of locating records close to one another is faster reading times. Existing database systems may have data scattered throughout a memory device. Reading data arranged in this manner is time consuming because the reading process has to skip from one physical location to another physical location. For example, a hard disk drive must physically move a reading head from location to location. FIG. 3a shows one illustrative embodiment where data from the second trading record 310 is stored in a sequential fashion in relation to the data stored from the first trading record 305. Unlike conventional databases, the trading data stored and as represented by 305 and 310 are not associated with an index for locating the data. As additional data and/or trading records are received, they may be stored in a substantially sequential ordering. As used herein "substantial sequential ordering" means that data is physically positioned on a computer-readable medium in a direction that a read operation will follow and does not imply that a sort operation is performed on the records or data before storing. For example, data 315 is stored substantially sequential to data 310, which is stored substantially sequential to data 305. When memory module 300 is implemented with a hard disk drive, for example, a reading head may follow a straight path to read records 305, 310 and 315.

While the exemplary embodiment does not have an index as used in conventional databases, the collection of data as represented by first trading records 305, 310 and 315 can perform row selection at the same speed as an indexed database. Indeed, in some embodiments, eliminating conventional databases indexes results in queries that have the same speed for all columns in the table. Conventional database typically have an index on every column. This results in deleterious effects on the insertion speed. Conversely, a collection of data organized according to the various embodiments of the present invention allows for rapid insertion speeds and is particularly useful and advantageous in real-time insertion situations, such as those routinely encountered in the trading industry. Moreover, by providing a collection of data without an associated database-type index, more space is available on the computer readable medium to store data, such as that present in the data of the first trading record and second trading record (305, 310). An increases in data storage may be achieved by eliminating the use of a conventional database-type index. In at least one implementation, the elimination of an index may double the amount of data that may be stored on the computer readable memory.

As one skilled in the art will appreciate, a computer-readable medium may comprise a plurality of linked drives and/or modules, wherein the data is stored in a sequential fashion as described above. In at least one embodiment, the plurality of drives and/or modules may be at different physical or remote locations. For example, FIG. 3b shows two distinct physical computer-readable media (330, 335) that are configured to store data in a sequential ordering process. As seen in the figure, first trading record 305 is stored in the first portion of computer-readable medium 330, sequentially followed by a first portion of second trading record 310a. Since the trading record consisting of section 310a and 310b is too large to be entirely stored on computer-readable medium 330, the second portion of the second trading record 310b is stored on the first portion of computer-readable medium 335. Trading record 315 is also stored on computer-readable medium 335 and substantially follows the second portion of the second trading record 310b. In this regard, the trading records 305, 310, and 315 are sequentially stored on a plurality of computer-readable media are arranged in a sequential order. The computer-readable media, such as computer-readable media 330 and 335, do not have to be physically ordered in sequential manner, but rather must be configured to be sequentially store data.

Figure 4:
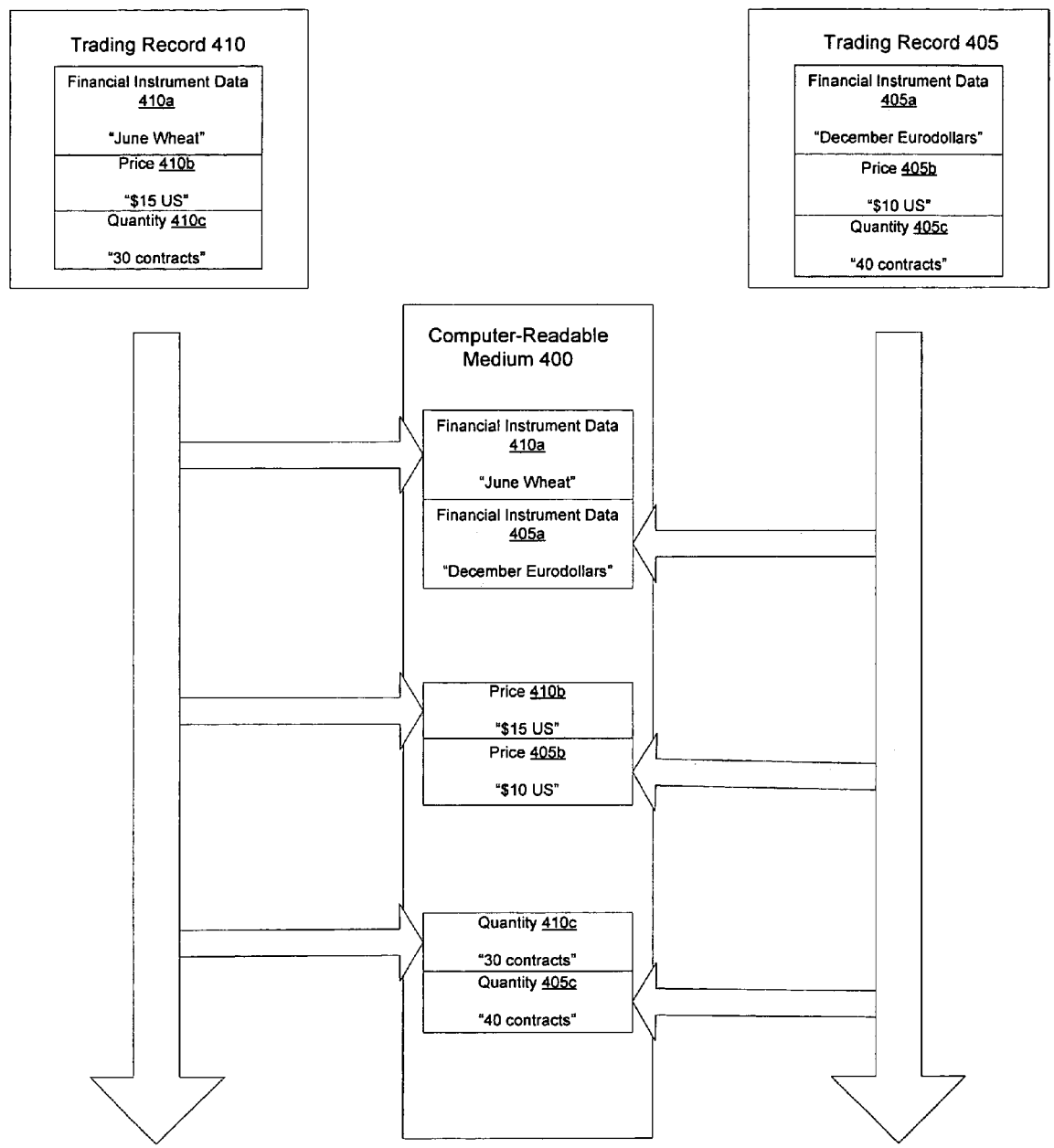
FIG. 4 illustrates yet another illustrative collection of trading data in accordance with the present invention.

As briefly mentioned above, one or more trading records may comprise a plurality of fields. In one such embodiment, optional step 225 may be implemented to determine if one or more of the trading record comprise more than one field. In one embodiment, upon determining that more than one field exists, step 230 may optionally be initiated to parse a first field from one of the trading records. As shown in FIG. 4, data 405, which may be similar to trading record 305 is received and it is determined through a process, such as process 225, that it comprises multiple fields. Optional step 230 may be initiated to parse the data into a plurality of fields. As shown in the figure, data 405 is parsed into at least three fields, wherein financial instrument data 405a comprises an identification of the financial instrument, such as an option contract to purchase wheat in June, price data 405b comprises information on the price of the contract, and quantity data 405c may comprise information on the quantity, such as quantity of financial instruments. As discussed above, more or fewer fields may be utilized in various embodiments of the invention. Indeed, in one embodiment, optional step 235 may be implemented to determine if a field present in received data, such as trading record 405 comprises a new field, wherein upon the detection of a new field, a portion of the computer readable medium may be allocated to store data associated with the new field (step 240). While step 225 is shown in relation to receipt of the first trading record, one skilled in the art will realize that the step may be utilized upon receipt of any of the trading records.

In one embodiment, data associated with a first field of a trading record, such as financial instrument data 405a may be stored in a first location on the computer readable medium (step 245). Data associated with other fields of the same record is not stored substantially sequential to financial instrument data 405a, but may be placed on the computer readable memory at a different location (see exemplary embodiment of step 250). Upon receiving another trading record, such as trading record 410, it too may be parsed into a plurality of data associated with different fields. For simplicity, FIG. 4 shows trading record 410 subdivided according to the same fields as record 405. As shown in the figure, step 250 sequentially stores the data having a matching field (410a comprises information relating to the field of "financial instrument") on the computer-readable memory, wherein data of the first field 405a that was initially stored in step 245 is substantially physically adjacent to the data of the first field 410a that was stored in step 245.

As seen in FIG. 4, other matching fields of different trading records, such as trading records 405 and 410 may also be stored in the same manner. For example, price fields 405b and 410b are stored sequentially wherein price data 410b is substantially sequential to and follows price data 405b. (see also; quantity data 405c and 410c). The data may be stored sequentially as it is received and in at least one embodiment is stored in real time allowing for the fast storage and manipulation of the data without having to construct and update a database-type index. Moreover, while the illustrated computer-readable memory of FIG. 4 illustrates a single medium, one skilled in the art will realize a plurality of computer readable media could be utilized to achieve the same aspects of the invention.

Embodiments of the invention also relate to methods of performing a query on a computer readable medium, such as computer readable mediums having data stored in accordance with several or all of the steps and embodiments discussed in regards to FIGS. 2-4. In one embodiment, the query relates to a method of processing an order received at a match engine. An order for at least one financial instrument may be received at a match engine, which may be implemented, for example, with match engine module 106. In one embodiment, at least one parameter or field may be extracted from the order. Upon extracting the at least one field or parameter, the field(s) that were extracted are compared to fields and/or parameters within a non-indexed collection of data representing pending orders.

For example, looking back to FIG. 3a, where trading records 305, 310 and 315 represent pending orders, the comparison may be initiated at the upper starting portion of record 305 and proceed through trading records 305, 310, and 315 in a sequential manner based on proximate physical location of the records. Since there is no database-type index, the data within trading records 305, 310 and 315 may be analyzed from different angles or perspectives at a more rapid pace than utilizing conventional database structures. Indeed, in some situations certain fields of data are unlikely to have data to meet the query being searched. For example, if the query relates to the quantity of financial instrument fields, a query against data located in currency fields is unlikely to yield useful information in many cases. Searching a collection of data arranged such that records or fields are physically located next to one another in a memory module in the direction of a read operation of the search allows for faster query execution when compared to queries performed on indexed databases having records or fields distributed throughout a memory module.

Yet in other embodiments, only distinct portions of trading records may be queried. For example, in one embodiment the pending orders may be organized as set forth in FIG. 4, wherein a plurality of trading records are stored wherein matching fields of different trading records, such as trading records 405 and 410 are stored in a substantially sequential fashion without an associated database-like index. For example, price fields 405b and 410b are stored sequentially and wherein price field 410b is substantially sequential to and follows price field 405b. According to one embodiment of the invention, only data categorized as having certain fields will be queried. This determination may be based on a user-input, an algorithm, or a combination of user preference and a function of one or software applications.

This can be more readily seen when reviewing FIG. 4. If a query is directed towards the price of a pending order, the comparison of the query and the data stored on the computer readable medium may be initiated at beginning of price data 405b and proceed in a substantially sequential fashion to price data 410b and through any additional price data located following price data 410b. The searching and comparison of the price data within the compared data will be performed without the use of a database-like index and will go in the sequential manner as described above. As stated above, the individual trading records, such as 405 and 410 as well as the individual fields of data such as 405a and 405b may be of a fixed length, thereby allowing a user and/or computer device to readily and accurately estimate the time to conduct the query of the trading records and/or individual data fields.

The speed at which queries may be performed when trading records are arranged as described above may be taken advantage of for other exchange and trading related activities. For example, traders, trading firms and exchange regulatory or enforcement divisions may wish to recreate the state of a market, such as pending bids and offers, at a given time. One conventional approach includes recording a snapshot of the state of the market for every change in the market. These snapshots require large amounts of storage space, even for data parameters that may not have changed since the last snapshot.

Figure 5:
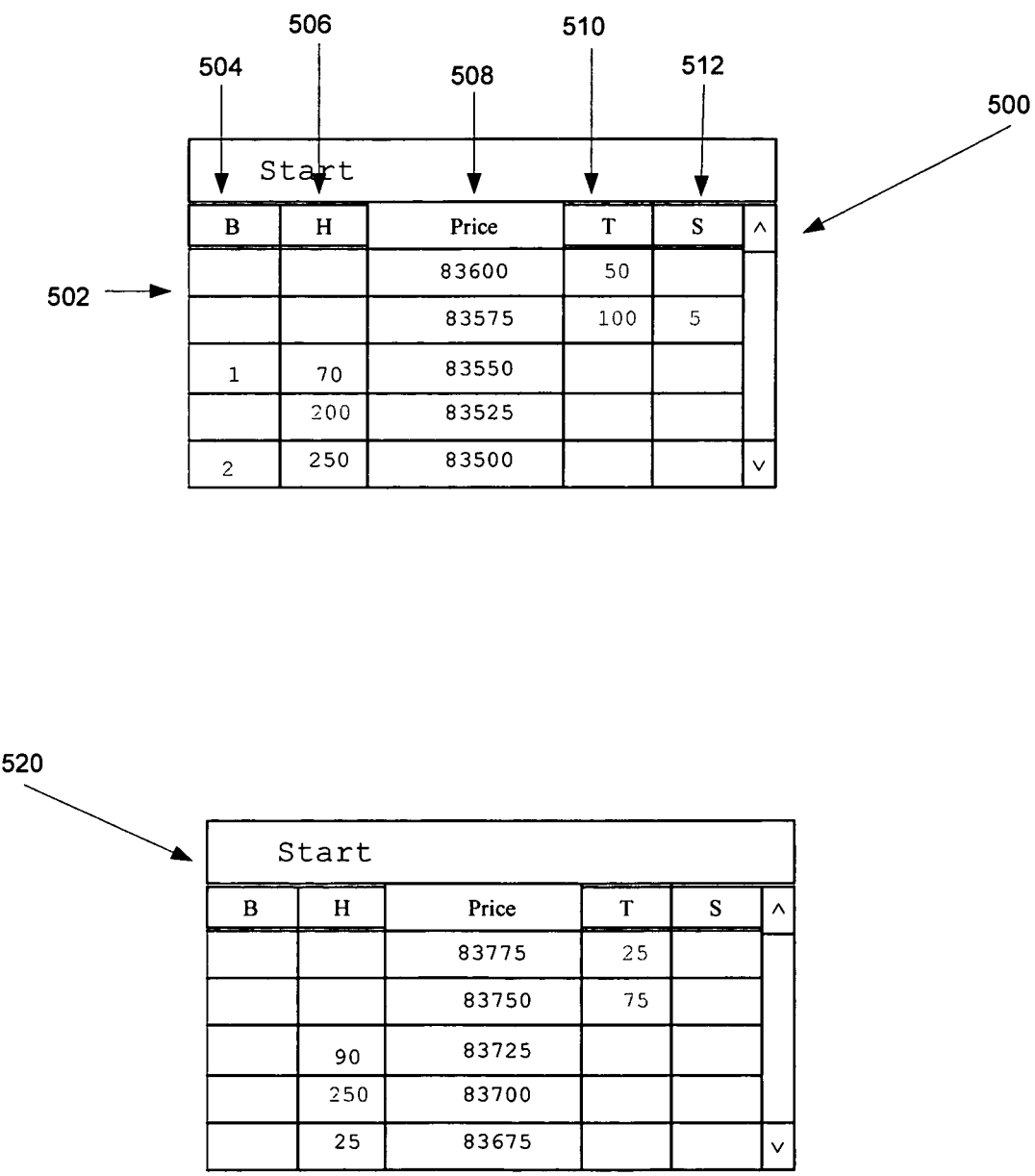
FIG. 5 illustrates an exemplary graphical user interface that may be used to display market depth information.

FIG. 5 illustrates an exemplary graphical user interface 500 that may be used to display market depth information and allow traders to trade financial instruments. The figure is helpful to aid the reader in understanding the type and amount of information that represents the state of a market. Graphical user interface 500 includes a price and quantity grid 502. Price and quantity grid 502 may contain five columns. A buy column 504 displays a user's working buy order quantities. As used herein, a user may be a trader. Each user will have different values in this column reflecting their buy order quantity. A hit column 506 displays the market bid quantities. Prices for individual rows are displayed in a price column 508. A take column 510 displays market ask quantities. And, a sell column 512 displays a user's working sell order quantities. Individual entries may be color coded to assist users in quickly interpreting the displayed information. For example, entries in buy column 504 and hit column 506 may be in blue and entries in take column 510 and sell column 512 may be in red.

In accordance with one embodiment of the invention, a trading firm, exchange or other entity may record trading records in a non-indexed collection of data, as described above. The speed at which such a collection may be queried and processed allows such entities to quickly recreate the state of the market for any time period. For example, an initial state of the market may first be determined and then all of the orders placed at an exchange may be processed in the same manner that they would be processed by an exchange until the desired point in time. For example, graphical user interface 500 (shown in FIG. 5) may represent an initial state of a market. All of the incoming orders received at an exchange may be stored sequentially in one or more memory modules as a non-indexed collection of orders such that the physical location of the orders corresponds to the order in which they were received. A computer device may then be programmed to retrieve the orders and recreate the state of the market.

Graphical user interface 520 represents the state of a market at some time after the state represented with graphical user interface 500. If we assume that graphical user interface 500 represents the state that existed at 9:00 on Monday morning and graphical user interface 520 represents the state that existed at 2:00 on the following Wednesday, the state represented with graphical user interface 520 may be recreated by starting with the state representing with graphical user interface 500 and processing orders in the sequential non-indexed collection of orders received until 2:00 on Wednesday.

Unlike conventional indexed databases storing and retrieving trading data according to one or more methods of the present invention does not require large quantities of trading data to be executed in batch mode overnight. Indeed, under traditional approaches, large amounts of data could not be adequately analyzed in real-time, thereby preventing many uses of the data. Under select embodiments of the invention, the analysis of the data sequentially stored on the computer readable memory can be continually processed in real-time to monitor activity while new data is being written to the computer readable medium, all without having to create, update, and maintain a space-consuming database index and constant interruption to jump physical locations within the computer readable medium to locate a certain data piece.

Figure 6:
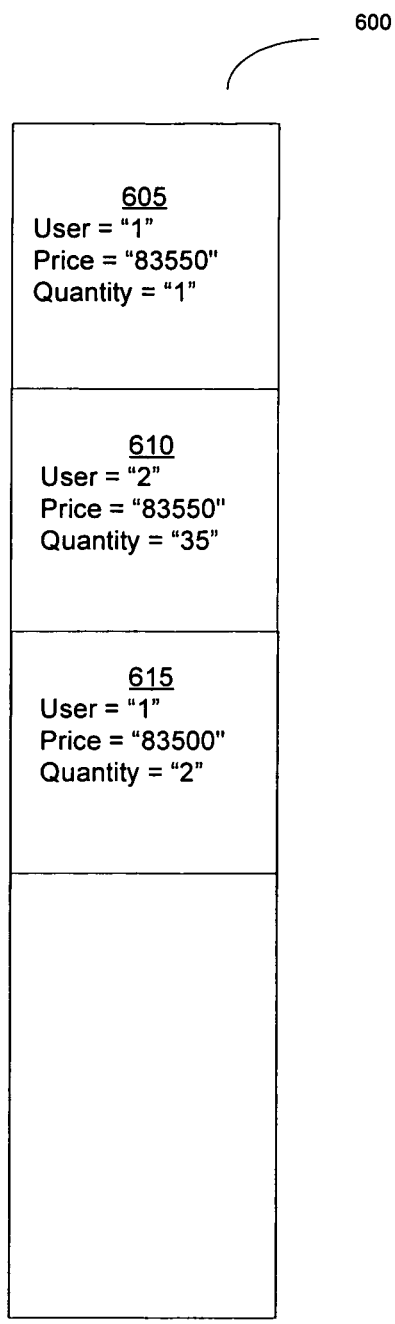
FIG. 6 illustrates one exemplary collection of data arranged in a substantially sequential ordering according to one embodiment of the invention.

FIG. 6 illustrates one exemplary sequential non-indexed collection of orders stored on a computer-readable medium 600. As seen in the figure, computer readable medium 600 comprises a plurality of orders. Seen at the upper end of computer readable medium 600 is order 605. Order 605 may be, for example, any of the quantities and/or prices displayed in the price and quantity grid 502. Order 610 may represent the next order received at an exchange and order 615 may represent the next order received at the exchange. One skilled in the art will appreciate that intervals between the receipt of orders 605, 610 and 615 may not be uniform.

Recreating market conditions may be readily accessible by querying methods, for example, as described above. Indeed, by following one or more embodiments of the invention, the analysis of the data sequentially stored on the computer readable memory can be continually processed in real-time to monitor activity while new data is being written to the computer-readable medium, all without having to create, update, and maintain a space-consuming database index and constant interruption to jump physical locations within the computer readable medium to locate a certain data piece.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. For example, aspects of the invention may be applied to data collections that are not related to exchanges or trading. All are considered within the sphere, spirit, and scope of the invention.

The invention claimed is:

1. A computer-implemented method of processing trading data stored on a computer-readable medium comprising:
   (a) receiving a first trading record comprising trading data;
   (b) storing at least a portion of the trading data from the first trading record on a computer-readable medium;
   (c) receiving a second trading record comprising trading data;
   (d) storing sequentially at least a portion of the trading data from the second trading record on the computer-readable medium in a reception order of the first and second trading records, wherein the trading data from the second trading record is stored substantially physically adjacent to the trading data received from the first trading record and wherein neither the trading data from the first trading record nor the trading data from the second trading record is associated with an index;
   (e) receiving a search query; and
   (f) sequentially comparing, by a computer, at least a portion of the search query with the non-indexed collection of substantially sequential trading data located on the computer-readable medium beginning at a commencing location on the computer readable medium and continuing in a substantially physically adjacent sequential manner through all of the trading data stored on the computer readable medium to retrieve information from the trading records responsive to the search query.

2. The method of claim 1, wherein the computer-readable medium comprises a hard-disk drive.

3. The method of claim 2, wherein the computer-readable medium comprises a plurality of physical drives.

4. The method of claim 1, wherein the computer-readable medium comprises a solid-state memory module.

5. The method of claim 1, wherein the trading data is both received in step (a) and stored in step (b) substantially simultaneous to being generated.

6. The method of claim 1, wherein the trading data of both the first trading record and the second trading record is of a fixed length.

7. The method of claim 6, wherein the fixed length of the trading data of both the first and second trading record is substantially of equal length.

8. The method of claim 1, wherein (d) comprises:
   (i) determining the trading data of the first trading record received in step (a) and the trading data of the second trading record received in step (c) comprises more than one field;
   (ii) parsing a first field from the trading data of both the first trading record and the second trading record;
   (iii) storing the first field obtained from the first trading record in a first location on the computer-readable medium; and
   (iv) storing sequentially the first field obtained from the second trading record on the computer-readable medium, wherein the first field obtained from the second trading record is substantially physically adjacent to the first field obtained from the first trading record.

9. The method of claim 8, wherein at least a portion of the trading data that is not parsed in step (ii) is stored in a physically separate computer readable medium.

10. The method of claim 8, further comprising:
   (v) determining the trading data received in the first trading record or the second trading record comprises a new field that is not currently stored on the computer readable medium;
   (vi) allocating a portion of the computer readable medium to store the data within the new field; and
   (vii) storing the data of the new field in the portion allocated in step (j), wherein the data of the new field is stored sequentially as it is received, whereby successive trading records comprising data within the field received in (i), are stored sequentially in a substantially physically adjacent manner.

* * * * *